United States Patent [19]

Cannon et al.

[11] Patent Number: 4,553,080
[45] Date of Patent: Nov. 12, 1985

[54] POSITION TRANSDUCER

[75] Inventors: Lee E. Cannon, Bozeman, Mont.; Peter C. Schmitt, West Bloomfield, Mich.; Dan R. Cheever, Bozeman, Mont.

[73] Assignee: Allen-Bradley Company, Milwaukee, Wis.

[21] Appl. No.: 516,742

[22] Filed: Jul. 25, 1983

[51] Int. Cl.$^4$ .......................................... H02K 29/04
[52] U.S. Cl. .................................... 318/696; 318/685
[58] Field of Search ................. 318/696, 685; 368/157

[56] References Cited

U.S. PATENT DOCUMENTS 4,375,049  2/1983  Grand Chavin .................... 318/696
4,422,040 12/1983  Raider ........................... 318/490 X Primary Examiner—William M. Shoop, Jr.
Assistant Examiner—Saul M. Bergmann
Attorney, Agent, or Firm—Barry E. Sammons

[57] ABSTRACT

A stepping motor is employed as a rotary position sensor by applying a bias current to one pair of its windings and sensing the signals produced by another pair of windings. The bias current produces a magnetic detent which defines the increments of rotation and the phase relationship of the signals produced by the other two windings indicates direction of rotation.

3 Claims, 4 Drawing Figures

POSITION TRANSDUCER

BACKGROUND OF THE INVENTION

The field of the invention is rotary position transducers such as incremental position encoders that monitor shaft rotation.

There are numerous applications where a knob or crank is manually turned to carry out a control function. In a numerically controlled machine tool, for example, a handwheel may be provided on the control panel to enable the operator to manually "jog" the cutting tool along one or more axes of motion. The amount of handwheel rotation is translated into a digital quantity which is employed to drive the appropriate servomechanism the desired distance.

In prior control systems incremental shaft encoders are employed to translate the handwheel position into a digital quantity suitable for driving the servomechanism. While such encoders work well, they are expensive, precision instruments. In addition, mechanical detent mechanisms must be attached to the shaft of such encoders to provide the user with the proper touch, or feel. Such mechanical mechanisms add further complexity and cost and reduce the overall reliability of the system.

SUMMARY OF THE INVENTION

The present invention relates to a position transducer which provides a magnetic detent action and a reliable output signal that indicates the direction of each increment of shaft rotation. More specifically, the present invention includes a stepping motor having a plurality of pairs of windings, a bias source connected to one of the stepping motor winding pairs to provide a bias current in the one pair which generates a magnetic detent force which defines increments of shaft rotation, and a detector circuit connected to another pair of stepping motor windings to produce a signal indicative of the direction of shaft rotation each time it is advanced one increment.

A general object of the invention is to provide a reliable incremental position transducer. No mechanical mechanism is required to provide the detent force. Instead, the detent force is produced by the magnetic field generated by the stepping motor windings. The strength of the detent force can be easily adjusted by changing the magnitude of the d.c. bias current flowing through the windings.

Another general object of the invention is to minimize the electronic circuit required to provide an indication of shaft rotation. Each time the stepping motor shaft is rotated one increment, signals are induced in the motor windings by a permanent magnet carried on the shaft. The phase of these signals indicates the direction of rotation and their amplitude is determined by the speed of rotation. The snap action provided by the detent force insures sufficient shaft speed to provide signals of adequate amplitude.

A more specific object of the invention is to provide a magnetic detent which is suitable for manual operation. To insure that a snap action is achieved a flexible coupling is employed between the stepping motor shaft and the handwheel. As the operator rotates the handwheel, the magnetic detent places a reverse torque on the flexible coupler. When the handwheel is rotated into the next detent magnetic field the stepping motor shaft is accelerated forward by the detent magnetic field and the torsion in the flexible coupler. A crisp snap action is thus achieved regardless of the speed at which the operator rotates the handwheel.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
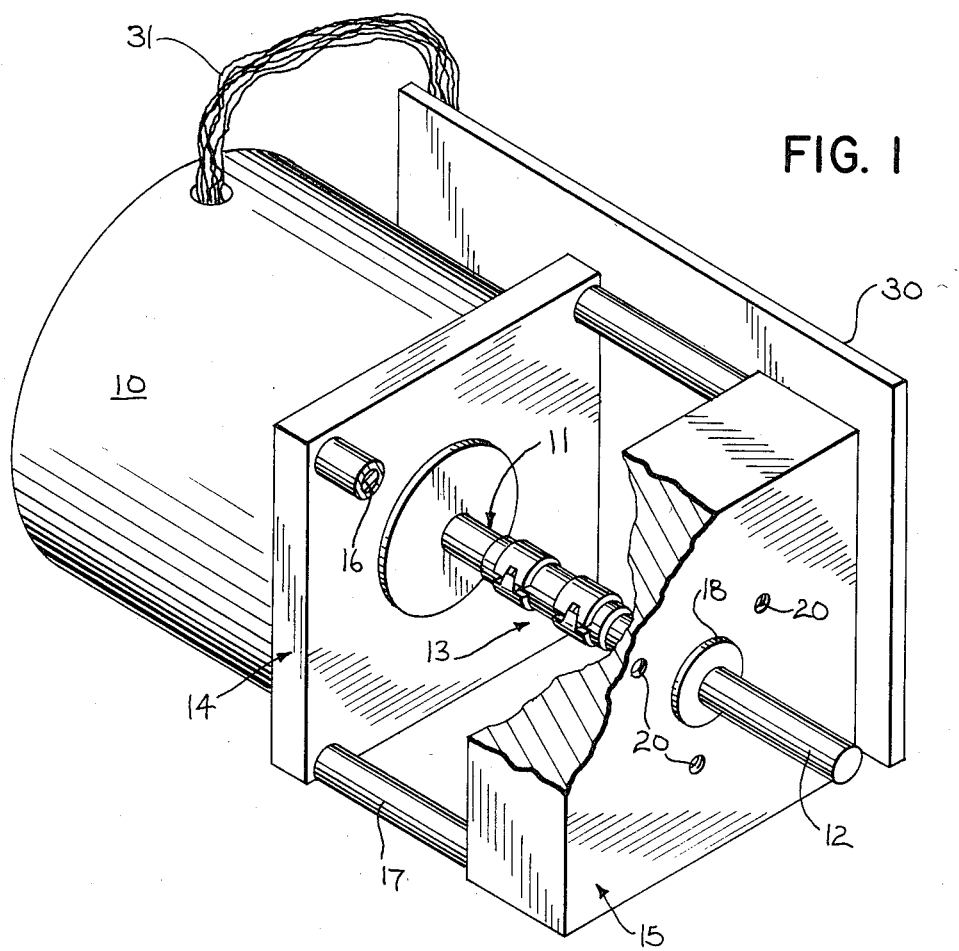
FIG. 1 is a perspective view with parts cut away of the invented position transducer.
Figure 2:
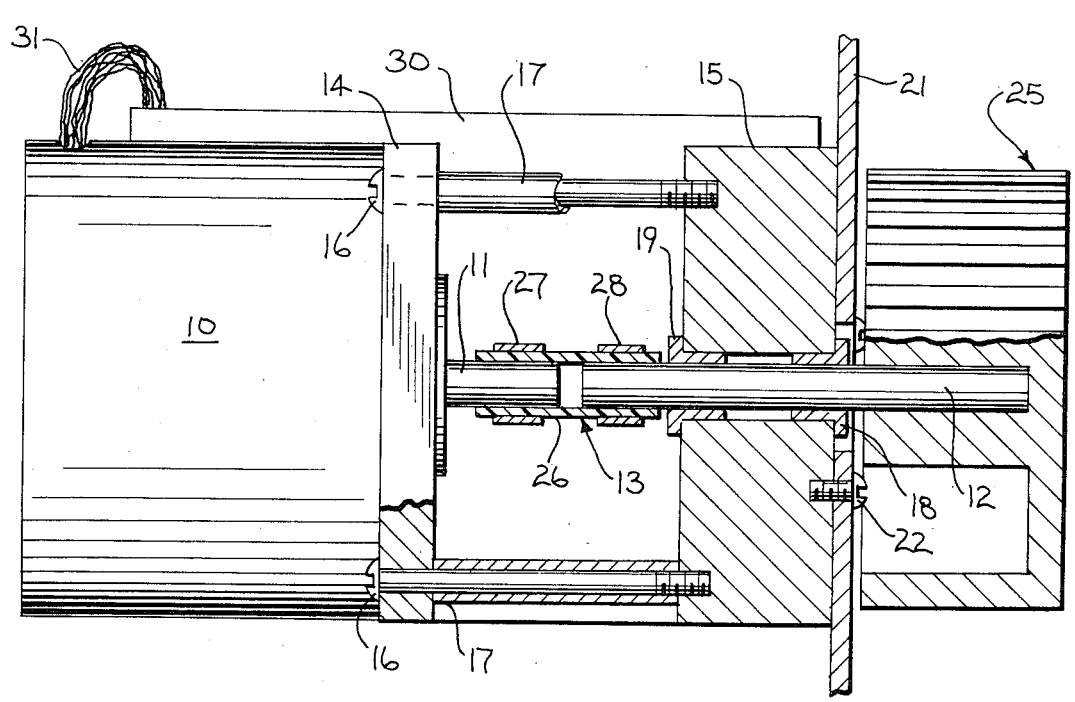
FIG. 2 is a side elevation view of the position transducer of FIG. 1 with parts cut away.

Referring particularly to FIGS. 1 and 2, the position transducer includes a stepping motor 10 which has a circular motor shaft 11 that extends forward from the motor 10 and is connected to a handwheel shaft 12 by a flexible coupler 13. A model 23J-6003 permanent magnet stepping motor manufactured by Dana/Rapidsyn is employed, and it includes an integral flange 14 which extends outward around its leading edge.

A mounting block 15 is connected to the flange 14 by a set of four screws 16 which are received in threaded openings in the mounting block 15. Cylindrical spacers 17 surround each screw 16 and serve to retain the mounting block 15 firmly in position a selected distance in front of the stepping motor 10. The mounting block 15 rotatably supports the handwheel shaft 12 which extends through an opening in its center. A pair of bushings 18 and 19 are retained in this opening and serve as bearings for the shaft 12. Three threaded openings 20 are formed in the front surface of the mounting block 15 and are disposed equidistantly around the shaft 12. The entire structure may be fastened to a control panel 21 with screws 22 which are received in these threaded openings.

As shown best in FIG. 2, a knob, or hand crank 25 is fastened to the end of the shaft 12, and when it is rotated, a torque is applied to the stepping motor shaft 11 through the flexible coupler 13. The coupler 13 is comprised of an elastomeric sleeve, or tube 26 which fits snuggly over the ends of the respective shafts 11 and 12 and which is clamped tightly to each shaft 11 and 12 by respective compression rings 27 and 28. The motor shaft 11 is subject to a detent force which at first resists shaft rotation away from its rest position. This restraining detent force twists the flexible coupler 13 as the handwheel 25 is rotated away from a rest, or detent, position, and when the motor shaft 11 is rotated to the next detent position, the torque produced by the twisted flexible coupler 13 as it untwists adds to the torque produced by the detent force. This provides an improved snap action regardless of the speed at which the user rotates the hand crank 25.

As shown in FIG. 1, a printed circuit board 30 is mounted to one edge of the flange 14 and mounting block 15. Wires 31 leading from the four windings in the stepping motor 10 connect to circuitry on this board 30, and as will now be described in detail, this circuitry functions to supply current to one pair of the windings and to receive signals produced by the other pair of windings.

Figure 3:
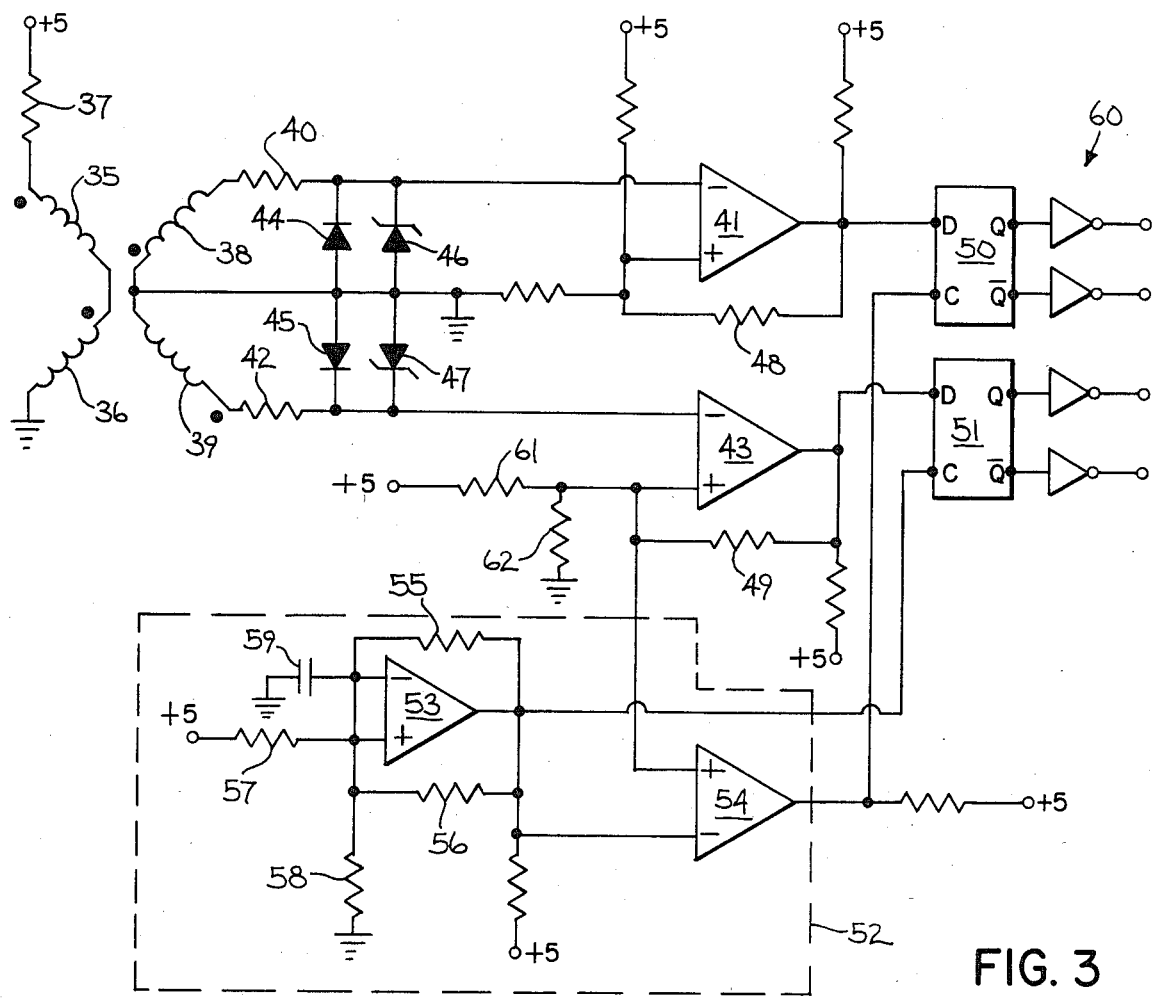
FIG. 3 is an electrical schematic diagram of the position transducer of FIG. 1.

Referring particularly to FIG. 3, two of the stepping motor windings 35 and 36 are connected in series with a resistor 37 across the five volt power supply. The current flowing through the windings 35 and 36 produces a magnetic detent force which establishes 50 detent positions for the stepping motor shaft 11. These detent positions are spaced equidistantly around the shaft's axis of rotation, or in other words, 7.2 degrees apart. The strength of the magnetic detent force is determined by the magnitude of the bias current flowing in the windings 35 and 36, and this in turn is controlled by the size of the resistor 37. A bias current in the range of 100 to 125.5 milliamperes is typical.

The two remaining stepping motor windings 38 and 39 produce signals when the shaft 11 is rotated. These signals indicate that an increment (i.e., 7.2 degrees) of shaft rotation has occurred. The geometry of the windings 38 and 39 is such that the signals which they produce are approximately 90 degrees out of phase with each other. The phase relationship (leading or lagging) of the two signals is determined by the direction of shaft rotation and their amplitude is a function of shaft speed.

The signal produced by winding 38 is applied through a resistor 40 to the inverting input of an operational amplifier 41 and the signal from winding 39 is coupled through resistor 42 to operational amplifier 43. Diodes 44 and 45 limit the peak negative voltages of these signals and zener diodes 46 and 47 limit the peak positive voltage of each signal to 3.6 volts. The amplifiers 41 and 43 have feedback resistors 48 and 49 which provide positive feedback to their non-inverting inputs, and their outputs are thus driven into saturation by the stepping motor signals. These "squared up" output signals are applied to the D inputs on respective D-type flip-flops 50 and 51.

The flip-flops 50 and 51 are clocked by a clock circuit 52. The clock circuit 52 is formed by a pair of operational amplifiers 53 and 54 which produce a 33 kilohertz clock signal for the flip-flop 51 and an inversion of this clock signal for the flip-flop 50. The operational amplifier 53 functions as an oscillator and includes resistors 55-58 and capacitor 59 which determine its frequency. Operational amplifier 54 functions as an inverter for the output of this oscillator and it receives a bias current from the same resistors 61 and 62 which bias the amplifier 43. It should be apparent that numerous alternative clock circuits may be substituted for that described herein which provide 180 degree out of phase clock signals to the flip-flops 50 and 51.

Figure 4:
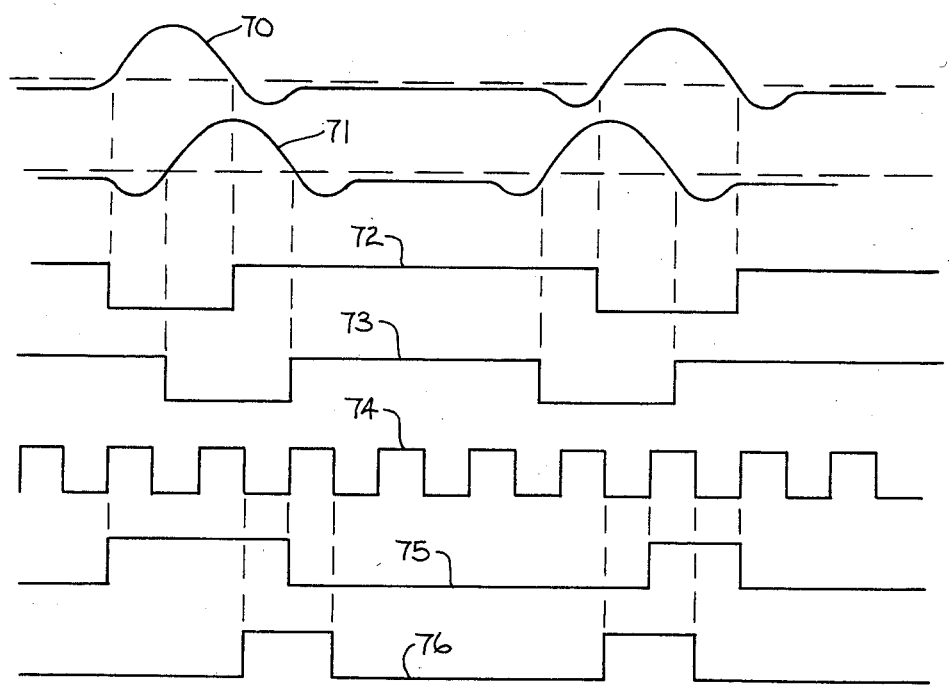
FIG. 4 is a timing diagram of the signals produced by the circuit of FIG. 3.

The coupling of the transducer output signals through the clocked flip-flops 50 and 51 insures that only a single output changes logic state at any one time. Both the Q and Q̄ outputs of the flip-flops 50 and 51 are connected to inverter gates 60 which buffer the outputs and provide signals suitable for transmission over a cable to the main control circuit board (not shown in the drawings). A buffered differential quadrature output is thus provided and is suitable for driving circuits designed to receive such signals from conventional incremental shaft encoders. One such circuit, for example, is disclosed in U.S. Pat. No. 3,646,360 entitled "Data Interpretation Network". Referring particularly to FIGS. 3 and 4, typical signals produced by the respective stepping motor windings 38 and 39 are shown as wave forms 70 and 71. Each positive peak in a signal 70 or 71 represents one increment of shaft rotation, and when the peak in wave form 70 leads the peak in wave form 71 the shaft is rotating in the forward direction. As shown by the second peaks in each wave form 70 and 71, when the shaft rotates in the reverse direction, the peak in wave form 71 leads the peak in wave form 70.

The outputs of the respective operational amplifiers 41 and 43 are shown in FIG. 4 by the wave forms 72 and 73. The wave forms 72 and 73 are logic level inversions of the respective wave forms 70 and 71 which are suitable for application to the flip-flops 50 and 51. One of the two clock signals produced by the clock circuit 52 is shown as wave form 74, and the resulting signals produced at the Q outputs of the respective flip-flops 50 and 51 are shown as wave forms 75 and 76. The phase sequence of the wave forms 70 and 71 is preserved throughout to convey the direction information to the outputs in addition to the motion information.

We claim:

1. A position transducer for manual input which comprises:

a stepping motor having a plurality of pairs of windings and a rotatable shaft;

a bias current source connected to provide current to one of said pairs of windings to generate a magnetic detent force which defines increments of stepping motor shaft rotation;

a detector circuit connected to another pair of stepping motor windings and being operable to produce an output signal indicative of the direction of stepping motor shaft rotation each time the shaft is rotated one increment; and a handwheel shaft which is rotatably supported adjacent to the stepping motor shaft and connected to the stepping motor shaft by means of a flexible coupler to impart rotation to the stepping motor shaft when the handwheel is rotated.

2. The position transducer for manual input as recited in claim 1 in which each winding in said other pair of stepping motor windings produces a separate signal which is phase displaced from the signal produced by the other winding, and the phase relationship of the separate signals indicates the direction in which the stepping motor shaft is rotated.

3. The position transducer for manual input as recited in claim 2 in which the detector circuit includes amplifiers for each of the separate signals.

* * * * *